Sept. 6, 1927.  1,641,567

W. H. BARLING

AIRCRAFT MOTOR CONTROL SYSTEM

Filed Sept. 27, 1924   6 Sheets-Sheet 1

INVENTOR
Walter H. Barling
BY
Robert H. Young
ATTORNEY

Patented Sept. 6, 1927.

1,641,567

UNITED STATES PATENT OFFICE.

WALTER H. BARLING, OF DAYTON, OHIO.

AIRCRAFT-MOTOR-CONTROL SYSTEM.

Application filed September 27, 1924. Serial No. 740,358.

This invention relates to an improved control system, particularly designed and intended for use with large aircraft of the multiple engine type.

One of the principal objects of the invention is to provide a control system for a right and left motor, or bank or group of motors, whereby the throttles of all of the motors may be simultaneously opened or closed, or whereby the throttles of the motors may be opened on one side of the aircraft and closed on the other side, or whereby any desired difference in speed of the motors on opposite sides of the central axis of the aircraft may be secured, such speed difference being utilized principally in maneuvering the craft about turns.

Another object of the invention consists in providing a control lever similar to a joystick, having connections with the opposed motors or banks of motors for controlling the motors in the manner above mentioned, the control lever having novel means for automatically locking the same in any position to which the pilot may have moved the same at the time he releases his grip on the lever.

A very important object of the invention resides in the provision of a main or pilot's control mechanism and an auxiliary or engineer's control mechanism which are interconnected in such a way that the pilot normally has control over all of the motors, but the engineer can at any time cut in and assume control selectively of any motor or group of motors, and control the same independently while the craft is in flight. This arrangement permits the engineer at any time to test any motor he desires, and therefore to return the motor to the control of the pilot, provision being made whereby the engineer's control mechanism for any motor is put in step or synchronized with the pilot's control at the time the pilot is to be given control by the engineer.

Other objects having reference to details of construction and arrangement to secure the characteristics above referred to are brought out with the foregoing objects in the course of the following description.

In the drawings illustrating the invention—

Throughout the views the same reference numerals are applied to corresponding parts.

The present invention relates to a motor control system designed and especially adapted for large aircraft of the multiple engine type, where two motors or banks of motors are mounted on opposite sides of the central longitudinal axis of the aircraft. As will appear hereinafter the invention is applicable to large aircraft where both a pilot and an engineer are included in the personnel of the craft, so that the latter is free to test and tune faulty motors while the aircraft is in flight under the guidance of the pilot. Certain features of the invention, such as the pilot's control lever, for example, are however applicable to aircraft generally and apart from use in connection with the arrangement herein described.

Figure 1:
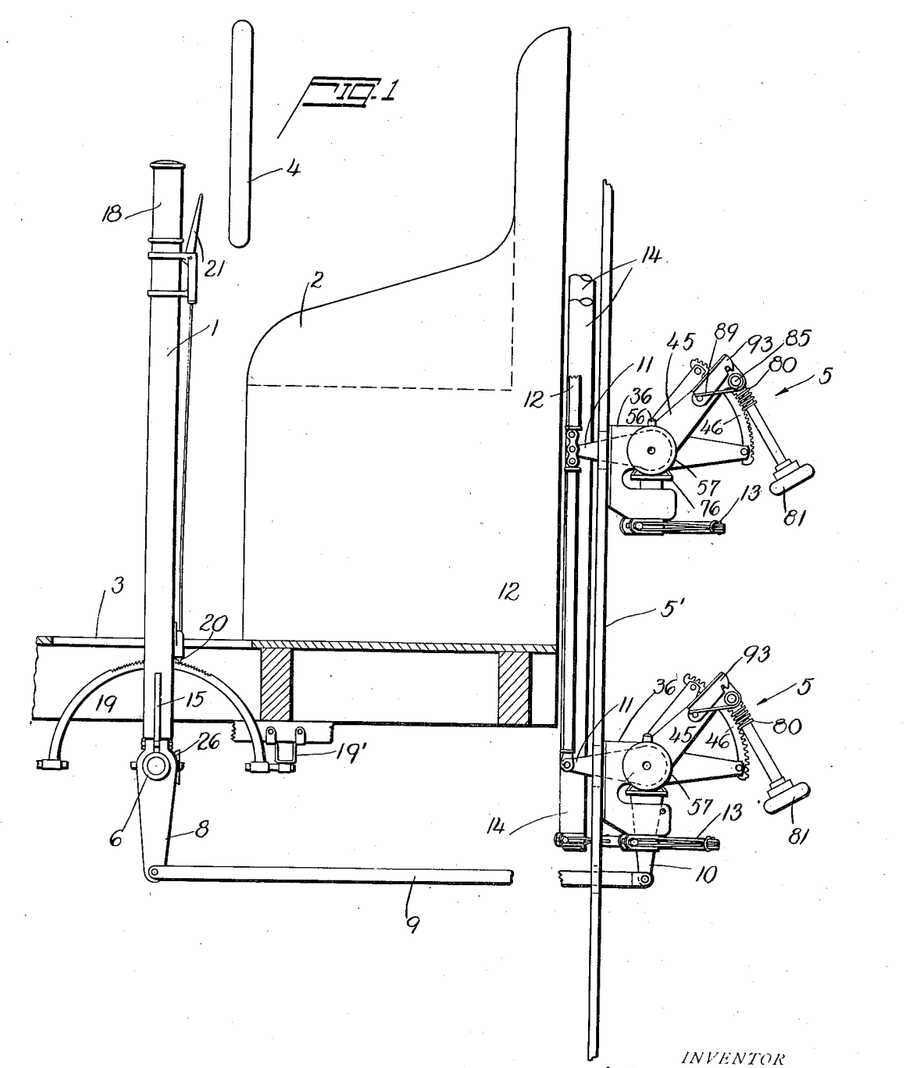
Fig. 1 is a schematic view showing the relation of the pilot's and engineer's controls.
Figure 2:
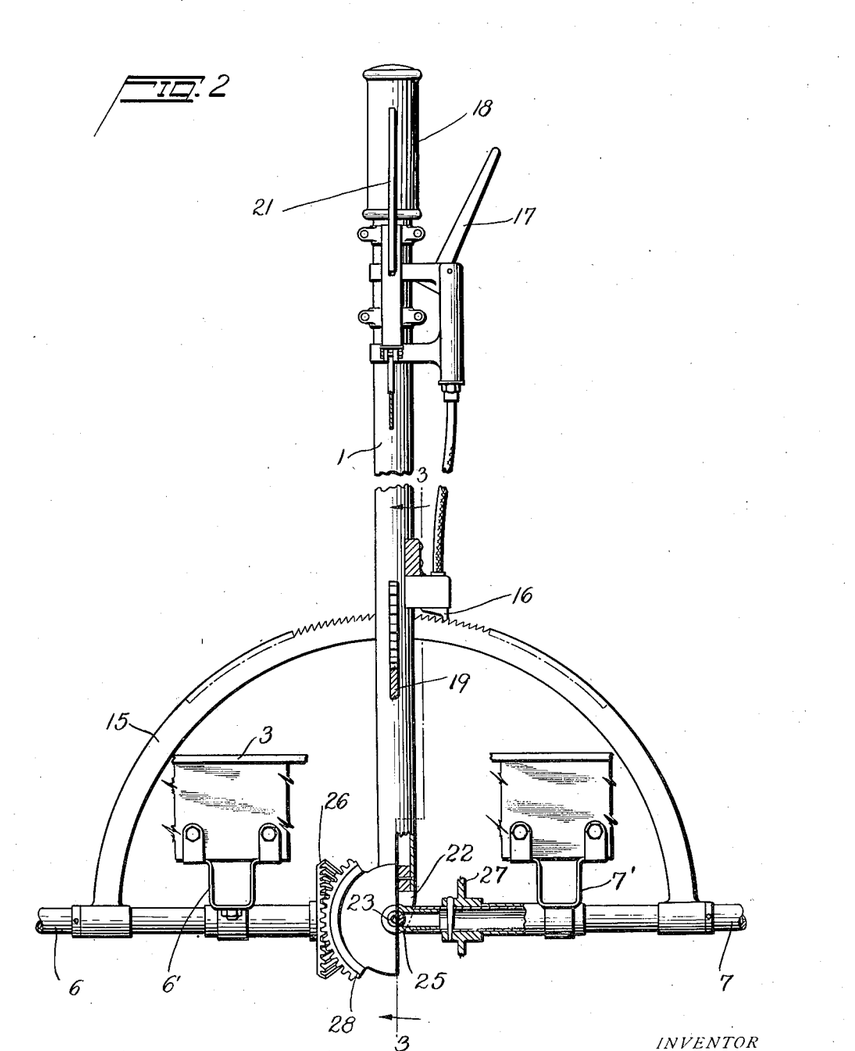
Fig. 2 is an enlarged view partly in section and partly in elevation of the pilot's control lever.
Figure 3:
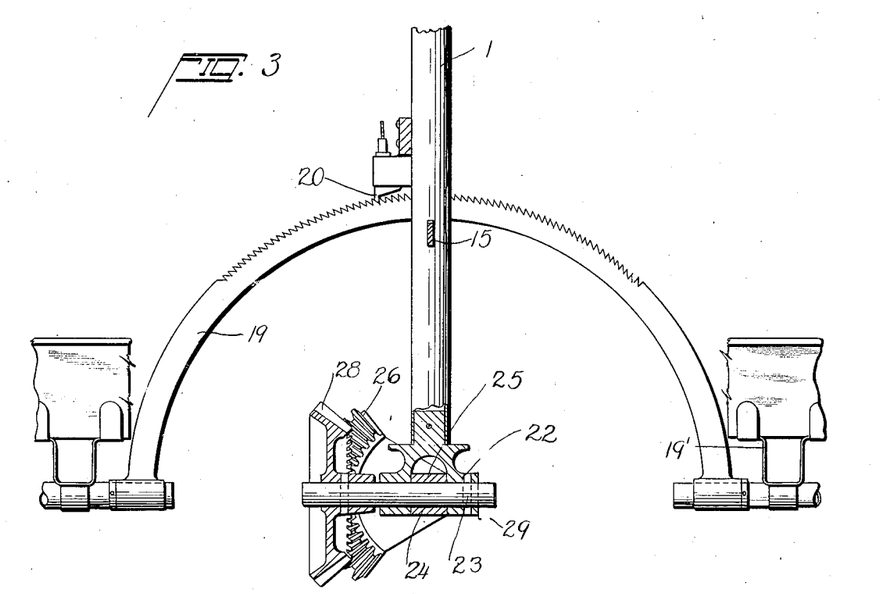
Fig. 3 is a cross sectional detail taken on the line 3—3 of Fig. 2.

The pilot's control lever 1 is mounted in between two pilots' seats 2, and movable in an opening in the floor 3 of the pilot's compartment of the aircraft. A dual control is found necessary because of the large loads involved in the manipulation of the large crafts' controls, and because of the considerable cruising radius of the large aircraft under consideration. Each of the pilots' seats 2 has an aerodynamic control wheel 4 in front thereof which when pulled backward causes the nose of the ship to rise or which when rotated causes the ship to roll laterally, one wing rising and the other falling. The lever 1 may be grasped and moved by either pilot from either seat, and serves entirely in the controlling of the throttles of the motors on both sides of the ship. When pushed forward it opens the throttles of all of the motors, and when moved laterally it causes the opening of the throttles of the motors on one side, and the closing of those on the other side of the ship. A sloping movement of the lever partially does both of the above functions by communicating a differential movement to the shafts connected to the throttles of the motors on opposite sides of the central axis of the ship. At this point it might be well to state that the construction and operating characteristics of the control lever adapt it for use as a joy-stick for aerodynamic control, and that it is with this thought in mind that claims relating to this feature of the present invention are to be read. The engineer's compartment in the particular embodiment in question, is located behind the pilot's compartment and it is here that a separate set of controls, linked with the pilot's control are located, to be taken in hand by the engineer when the occasion arises for the purposes of testing any motor or motors which may give trouble while the plane is in flight. The engineer's controls designated by the numeral 5, one of which is provided for each of the various motors, are connected with the pilot's control lever between the latter and the engines, and provision is made whereby the engineer may selectively cut in and assume control of any one or more motors, and after he has taken care of the same return them to the pilot for further control. The arrangement also provides for the putting in step with the other motors under the pilot's control, of a motor which the engineer desires to return to the pilot.

The pilot's control lever 1 is supported for universal movement in an opening in the floor 3 upon a pair of shafts 6 and 7, supported in bearings 6' and 7' from the underside of the floor 3. The shafts 6 and 7 extend laterally in opposite directions for the control of the opposed motors or banks of motors on opposite sides of the central axis of the ship. Each of the shafts has an arm such as that shown at 8 secured thereon connected by links 9 with the engineer's controls 5, only two of which are illustrated in Fig. 1. In the case of a ship equipped with six motors, three on each side of the central axis, there are two banks of three controls each for the opposed banks of motors. The controls 5 are illustrated mounted one above the other on a panel 5', the lowermost control having a bell crank 10 connected with the link 9. The controls 5 have levers 11 connected by linkage 12 so that the same movement is given to each of the controls in a bank. It will suffice at this point to state that the controls 5 are each provided with levers 13 which are caused to swing upon a movement of the bell crank 10, and a resulting movement of each of the levers 11. The levers 13 each communicate movement to a shaft 14, one of which is provided for each of the controls connected with the throttle of an engine through certain transmission, which it will not be necessary to describe in detail, but which is shown in a diagrammatic manner in Fig. 4, and will be referred to hereinafter. The construction of the controls 5 as will be described hereinafter permits the engineer to disconnect selectively any one of the controls to enable him to assume the control of any engine or engines he desires, provision being made for his returning the engine to the pilot only after he has placed the motor in step with the pilot's control by proper adjustment of the control 5 to secure a setting of the throttle of the engine in question just the same as the setting of the throttles of the other engines in the same bank, at the time the engine is being turned back to the pilot for control.

The shafts 6 and 7 support a ratchet sector 15 for pivotal movement in the movement of the pilot's control lever 1. The sector 15 passes through an opening in the lower end of the lever 1 and has a pawl 16, carried by the lever 1, which lodges in the periphery of the sector and locks the lever 1 in whatever position the pilot has moved the same when he releases his grasp. The pawl 16 is suitably spring pressed to be normally in engagement with the ratchet and is retractible by a small lever 17, pivotally mounted adjacent the handle 18 on the lever 1 to be moved to release the pawl 16 when the pilot grasps the lever. Another ratchet sector 19 is pivotally mounted in bearings 19' on the underside of the floor 3, and is disposed approximately in right angular relation to the sector 15. Similarly to the sector 15, the sector 19 passes through an opening in the lower end of the lever 1 and has a pawl 20 normally in engagement therewith but retractable by a small lever 21, similar to the lever 17. With these provisions the lever 1 locks automatically in any position to which it has been moved, simply upon the pilot's release of the lever. The lever 1 has a knuckle piece 22 rigidly secured to the lower end thereof which has openings to receive a stub shaft 23. The latter extends through an opening 24 in alignment with the openings in the knuckle 22 in a sleeve 25, swivelled in the inner ends of the shafts 6 and 7 which, it will be noted, are hollow. The inner ends of the shafts 6 and 7 have beveled gear sectors 26 and 27, respectively, pinned thereon. These gears mesh with another bevel gear 28, pinned on the stub shaft 23. The shaft 23 is held from displacement from the knuckle 22 suitably by a pin 29.

With the arrangement described, it will be seen that the control lever 1 is capable of universal pivotal movement about a point corresponding to the common intersection of the shafts 6 and 7 with the lever 1. If the lever 1 is swung, say, in the plane of the sector 19, the gear 28 functions to lock the gears 26 and 27 together and communicates rotary movement equally to both of the shafts 6 and 7 in the same direction. A forward movement of the lever, as it appears in Fig. 1, is arranged to open the throttles of all of the engines. A rearward movement causes a closing of the throttles. This is shown diagrammatically in Fig. 4. In this figure, the connections between the shafts 6 and 7 with motors 6ª and 7ª, respectively, on opposite sides of the central longitudinal axis of the ship are represented by rigid connections 30 and 31 respectively, connected to cranks 32 and connected with bell cranks 33. The latter are connected as indicated at 34 with bell cranks 35 which are connected, similarly as the bell cranks 33, with the motors 6ª and 7ª. The levers 33 and 35 with their connections 34 represent the engineer's controls 5, connected as shown in Fig. 1 by links 12. As stated above, upon a forward or rearward movement of the lever 1, the shafts 6 and 7 are rotated together in the same direction and to the same extent, thereby opening or closing the throttles of the motors 6ª and 7ª alike on both sides of the ship. If the lever 1 is moved slopingly, that is, diagonally, the connections secure partially both of the functions above referred to. This is due to a differential movement given the shafts 6 and 7. The motors 6ª on the one side could be speeded up beyond the speed of the motors 7ª if the control lever 1 were moved diagonally forwardly and to the right from the position shown in Fig. 4. The increased speed of the one bank of motors over the other, facilitates maneuvering the ship about a turn in an obvious manner. There is considerable advantage in this provision over the arrangement which relies solely upon the aerodynamic rudder control, unaided by a differential speed of the opposed banks of motors, in that a large craft in which the loads are heavy, can be turned without a considerable angle of bank and on a comparatively small radius.

Figure 4:
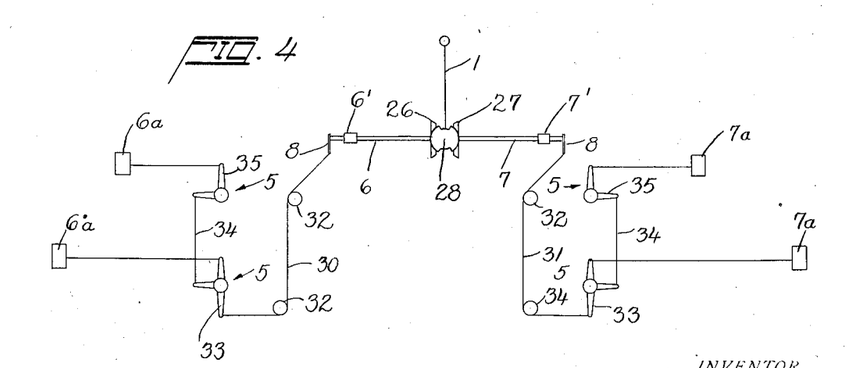
Fig. 4 is a diagrammatic view illustrating the system of connections between the pilot's control lever, the engineer's controls, and the opposed banks of motors for securing the operating characteristics herein-above mentioned.
Figure 7:
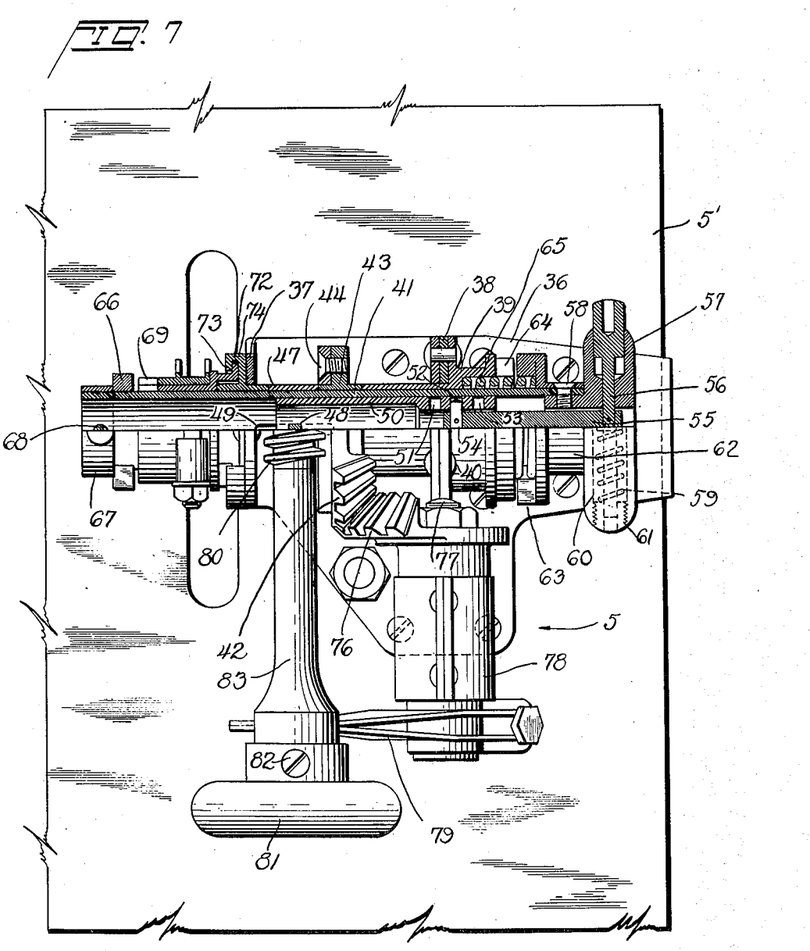
Fig. 7 is a front view of an engineer's control, half in section and half in elevation.

The engineer's controls, as shown diagrammatically in Fig. 4 and as further illustrated in Fig. 1 are included in the system between the pilot's controls and the engines. The controls are supported from the panels 5′ by brackets 36. The latter are U-shaped to provide spaced bearings 37 and 38. The bearing 38 has a sleeve 39 riveted thereto, as shown at 40, and receives a tubular shaft 41 which passes through the bearing 37 and extends beyond both the bearings 37 and 38. A bevel gear sector 42 has its bearing 43 on the shaft 41 between the bearings 37 and 38, and abutting the end of the sleeve 39 as shown in Fig. 7. The bearing 43 is secured as by means of screws 44 to a lever 45 extending radially from the shaft 41 for a purpose which will presently appear. A gear sector 46 has its bearing 47 on the shaft 41 between the bearing 43 and the bearing 37. The shaft 41 is held against rotation relative to the bearing 47 by a pin 48, fixed in the bearing 47 and passing through an elongated slot 49 provided in the shaft 41. The slot 49 permits endwise movement of the shaft 41 for a purpose which will presently appear. A sleeve 50 has the shaft 41 slidable relative thereto, and is fixed with the bearing 47 by means of the pin 48 against endwise movement relative to the bearings 37 and 38. The sleeve 50 has sockets 51, 52 and 53 in the one end thereof, in any one of which a pin 54 is adapted to be received in either one of three positions to which the shaft 41 may be moved and set. The pin 54 is held in the outer end of a rod 55 secured on the end of a plunger 56, operating in a knob 57, secured rigidly by means of screws 58 to the end of the shaft 41 adjacent the bearings 38. A coiled tension spring 59 operating in a bore 60 in the knob 57 behind a plug 61, serves normally to urge the pin 54 with the plunger 56 and rod 55 upwardly so the pin 54 will engage in one of the sockets 51, 52 or 53 when moved adjacent thereto. The screws 58 for fastening the knob 57 to the end of the shaft 41, also serve to secure a clutch collar 62 to the one end of the shaft 41, alongside the knob 57. The collar 62 has lugs 63 thereon, arranged to engage in notches 64 provided in the end of the sleeve 39. A coiled tension spring 65 about the shaft 41, acts between the sleeve 39 and the collar 62 normally to urge the latter with the shaft 41 outwardly to move the lugs 63 out of engagement from the notches 64.

It will be seen that the shaft 41 is free to rotate with the sector 46 only when the lugs 63 are out of engagement with the notches 64. In Fig. 7 the pin 54 is shown engaged in the socket 52 in the sleeve 50. This mid position is the neutral position of the shaft 41 as will appear more clearly presently. When the plunger 56 is depressed and the knob 57 pressed inwardly, thereby moving the shaft 41 inwardly, the pin 54 is moved over to the socket 51 and when released is urged into engagement therein by the action of the spring 59. At the same time the lugs 63 engage in the notches 64 and the shaft 41, together with the sector 46, is held rigidly against rotation, being fixed by the engagement of the lugs 63 in the notches 64 in the sleeve 39, held rigidly with the bearing 38. When the pin 54 is in the socket 51, the engineer has control of the motor with which the particular control is identified. In the other extreme position from the one just mentioned, that is, in which the pin 54 engages in the socket 53, a pair of lugs 66 on another clutch collar 67, fastened by means of a pin 68 to the opposite end of the shaft 41, engage in notches 69 in the bearing 70 of a lever 71, corresponding to one of the levers 11 hereinabove mentioned. The latter appear in Fig. 1 and, as first above stated, are controlled by the pilot in the movement of the control lever 1. It will therefore appear that in this position of the shaft 41, the pilot has control of the engine to which the particular control 5 is connected. In this position of the shaft 41, it is not held against rotation relative to the bearing 38, but is arranged to be rotated by the lever 71 due to the engagement of the lugs 66 in the notches 69. The lever 71 is held from moving freely endwise on the shaft 41 by the engagement of ears 72 on the bearing 70 behind lugs 73 provided on a bushing 74 riveted in the bearing 37 as indicated at 75. In this way the shaft 41 is not locked to the lever 71 except when the knob 57 is grasped and the plunger 56 depressed to permit movement of the shaft 41 outwardly to bring the lugs 66 of the collar 67 over into engagement with the notches 69 in the bearing 70 of the lever 71.

The bevel gear sector 42 meshes with another bevel gear sector 76 carried by a spindle 77 swivelled in a bearing 78 in the bracket 36. The spindle 77 has a lever 79 secured thereon which is connected with one of the shafts 14, in turn connected with the throttle of the engine for which the control 5 is intended. The lever 79 corresponds to one of the levers 13 that appear in Fig. 1. It will be noted that the view of the controls in Fig. 1 is the converse of the views in Figs. 5 to 7, the controls shown in Fig. 1 being those of the left bank, and the control illustrated in Figs. 5 to 7 being one of the right bank. The lever 79 is arranged to swing when the gear 42 is rotated. The gear 42 may be rotated by a movement of the lever 45. When the engineer has the control independent of the pilot, that is, with the pin 54 above mentioned engaged in socket 51, the sector 46 is held rigid in the manner above described. The lever 45 is arranged to be adjusted relative to the sector 46 by means of a worm 80 which can be manually rotated by a knob 81. The knob 81 is secured by means of a screw or screws 82 to a tube 83 having the worm 80 integral with the far end thereof. The tube 83 is rotatable on a rod 84 pivoted at 85 to the lever 45. A coiled spring 86 acts between the knob 81 and a washer 87, fitted over the reduced outer end 88 of the rod 84, to exert a drag on the rotation of the worm 80 and make the manual operation of the worm more or less steady and smooth.

Figure 5:
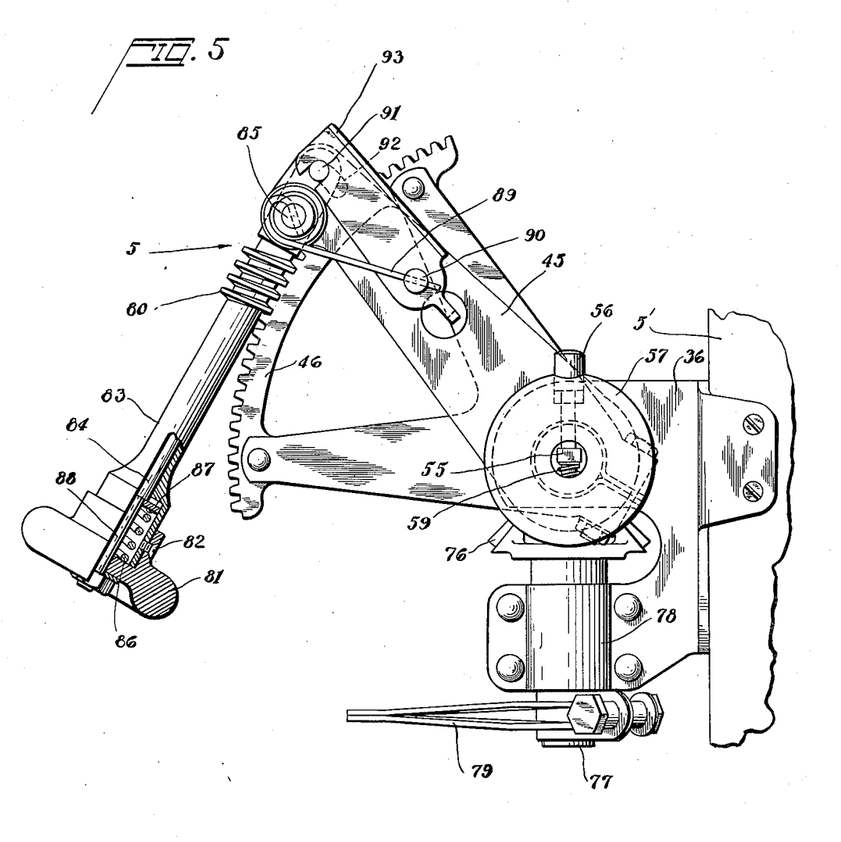
Fig. 5 is an enlarged side elevation of one of the engineer's controls.
Figure 6:
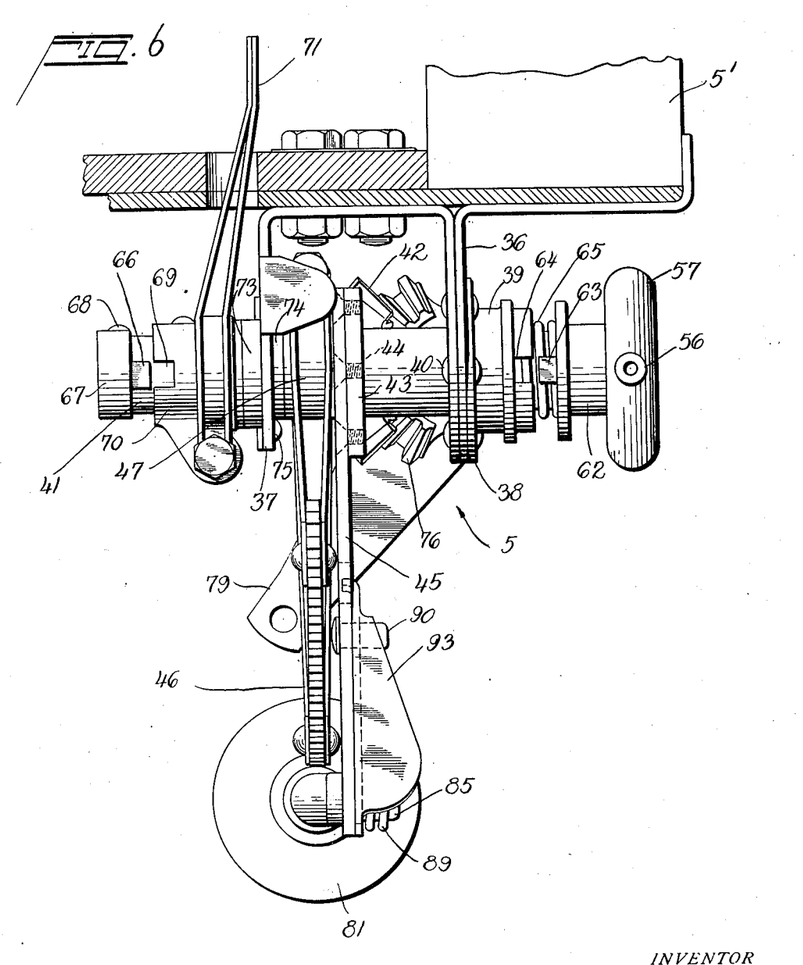
Fig. 6 is a plan view of Fig. 5.

The worm 80 is normally held in meshing engagement with the sector 46 by a spring 89 coiled about the pivot pin 85 and engaging a pin 90 on the lever 45. The rod 84 extends beyond the pivot pin 85 and has a cross pin 91 which extends through an arcuate slot 92 in the lever 45 to permit limited pivotal movement of the worm assembly relative to the lever 45. A latch 93 pivoted to the lever 45 on the pin 90 engages over the pin 91 as shown in Fig. 5, to hold the worm 80 in engagement with the sector 46. When this latch is swung clear of the pin 91 the worm 80 may be swung clear of the sector 46 so that the lever 45 can be oscillated by the knob 81 freely from one end of the sector to the other. This is of advantage to the engineer especially when tuning a motor. The worm 80 furnishes a means for finely adjusting the position of the throttle of an engine. This fine adjustment, while capable of use in the testing or tuning of an engine by the engineer, is particularly advantageous for placing a given engine in step with the other engines in the same bank after the engineer has completed his test and wishes to return the certain engine to the pilot for control. In this connection let us assume that the engineer has tested an engine that he desires to return to the pilot but that in the meantime the pilot has manipulated the throttles of the other engines in the same bank remaining under his control. The engineer, in order to return the engine to the pilot, must necessarily first adjust the throttle of his engine in step with those of the pilot, that is, the particular relative disposition of the gears 42 and 76 must be the same as the other gears in the same bank of controls. The clutch collar 67 on the control in question must be brought into the same position as the collars 67 on the other controls in the same bank in order that the lugs 66 will register with the notches 69 on the lever 71. At the time the engineer desires to return to the pilot the motor he has tested, he notes the relative positions of the lugs 66 and notches 69, and adjusts the worm 80 on the sector 46 to swing the lever 45 and thereby rotate the gear 42 and with it the shaft 41, enough to position the lugs 66 directly opposite the notches 69. Thereupon the engineer depresses the plunger 56 and draws outwardly on the knob 57 and engages the pin 54 in the socket 53, at the same time engaging the lugs 66 in the notches 69. Upon further movement of the lever 71 by the pilot, the sector 46 with the worm assembly swings together with the gear 42 in the oscillation of the shaft 41. The throttle controlled by the lever 79 is opened and closed as the gear 76 is turned in the movement of the gear 42. It is apparent that in a multiple engine plane where full power is ordinarily used in taking off, but where certain engines may be shut off while the plane is in flight, it is possible for the engineer to test and tune any engine he desires while the ship is in flight. At the same time the mechanism described permits the engineer to cut out such engines as are not needed in sustaining flight after the ship has taken off.

The operation of the control system and the elements comprising the same, has been set forth in connection with the description and it will therefore not be necessary to go further into a discussion thereof. It will be understood that the embodiment described, while it constitutes a preferred embodiment of the invention is capable of considerable modification and adaptation.

For example, a single lever is illustrated as the main pilot's control, but obviously two individual levers operable together in the same direction by one hand, or operable independently on shafts 6 and 7 may be used if desired as a main pilot's control.

It is to be understood therefore that all possible modifications and adaptations of the invention are intended to be included in the breadth of the appended claims that come within the spirit and scope of the invention.

I claim:

1. In an aircraft, a plurality of engines, a main control for all of the engines, and a secondary control for each of the separate engines, said secondary controls being connected with said main control in spaced relation between the latter and the engines.

2. In an aircraft, a plurality of engines, a pilot's or main control for all of the engines collectively, and engineer's or auxiliary controls for the engines selectively, said engineer's controls being capable of operation independently of said pilot's control.

3. In an aircraft, a plurality of engines, a pilot's or main control, for all of the engines collectively, and separate engineer's or auxiliary controls for the separate engines, said engineer's controls being adapted for removing any engine or engines from the pilot's control for separate manipulation by the engineer's controls.

4. In an aircraft, a plurality of engines, a main control for all of the engines, an auxiliary control for the separate engines connected with said main control and adapted to be disconnected therefrom selectively, and means for each of said auxiliary controls for placing the same in step with other controls in a group when the control is to be connected again with the main control.

5. In an aircraft or the like, opposed banks of motors, a main central control at another point on the aircraft, and separate banks of auxiliary controls for the opposed banks of motors, there being one control in a bank for each of the separate motors of the banks of motors.

6. In an aircraft or the like, opposed banks of motors, a main central control, and separate banks of auxiliary controls for the opposed banks of motors, there being one control in a bank for each of the separate motors of the banks of motors, each of said auxiliary controls being capable of disconnection separately from the main control for individual manipulation.

7. In an aircraft or the like, opposed banks of motors, a main central control, separate banks of auxiliary controls for the opposed banks of motors, there being one control in a bank for each of the separate motors of the banks of motors, each of said auxiliary controls being capable of disconnection separately from the main control for individual manipulation, and means for each of said auxiliary controls whereby the same may be brought into step with the other controls in the same bank when the control is to be connected again with the main control.

8. In a multiple engine aircraft, a pilot's compartment, a main control therein for all of the engines, an engineer's compartment, secondary controls therein for the separate engines, and connections between said main control and said secondary controls, linking all of said secondary controls in tandem for simultaneous operation from said main control.

9. In a multiple engine aircraft, a pilot's compartment, a main control therein for all of the engines, an engineer's compartment, secondary controls therein for the separate engines, and connections between said main control and said secondary controls, linking all of said secondary controls in tandem for simultaneous operation from said main control, said secondary controls being disconnectible separately for individual manipulation.

10. In a multiple engine aircraft, a pilot's compartment, a main control therein for all of the engines, an engineer's compartment, secondary controls therein for the separate engines, and connections between said main control and said secondary controls, linking all of said secondary controls in tandem for simultaneous operation from said main control, said secondary controls being disconnectible separately from the main control for individual manipulation, and having means whereby they may be again connected in tandem with the other controls and in step therewith.

11. In a multiple engine aircraft having opposed banks of motors on opposite sides of the central axis of the ship, a pilot's compartment, a main control therein for both banks of motors, an engineer's compartment, opposed banks of secondary controls therein for the opposed banks of motors, and connections between said main control and said secondary controls linking the separate banks of secondary controls in tandem for simultaneous operation from said main control.

12. In a multiple engine aircraft having opposed banks of motors on opposite sides of the central axis of the ship, a pilot's compartment, a main control therein for both banks of motors, an engineer's compartment, opposed banks of secondary controls therein for the opposed banks of motors, and connections between said main control and said secondary controls linking the separate banks of secondary controls in tandem for simultaneous operation from said main control, said main control being arranged to give a similar movement in the same direction to both banks of controls simultaneously or to give a differential movement to the separate banks of the controls in the same direction, or to operate the separate banks of secondary controls in opposite directions as desired.

13. In a multiple engine aircraft having opposed banks of motors on opposite sides of the central axis of the ship, a pilot's compartment, a main control therein for both banks of motors, an engineer's compartment, opposed banks of secondary controls therein for the opposed banks of motors, and connections between said main control and said secondary controls linking the separate banks of secondary controls in tandem for simultaneous operation from said main control, any secondary control in either bank being separately disconnectible from in tandem with the other controls in the same bank for individual manipulation.

14. In a multiple engine aircraft having opposed banks of motors on opposite sides of the central axis of the ship, a pilot's compartment, a main control therein for both banks of motors, an engineer's compartment, opposed banks of secondary controls therein for the opposed banks of motors, and connections between said main control and said secondary controls linking the separate banks of secondary controls in tandem for simultaneous operation from said main control, any secondary control in either bank being separately disconnectible from in tandem with the other controls in the same bank for individual manipulation, and having means whereby it may be again connected in tandem with the other controls and in step therewith.

15. In an aircraft, the combination of a control lever provided with a handle, a pair of ratchet sectors pivoted on transverse axes to swing in the movement of the lever, a pair of shafts, differential gearing connecting said shafts and said lever to communicate rotation to said shafts in the movement of said lever, and means to lock said lever against movement with relation to said sectors comprising a pawl for each ratchet sector and operating levers therefor adjacent each other on the handle of the control lever.

16. In an aircraft, the combination of a control lever, a pair of shafts coaxially arranged intersecting at a point with the control lever, gearing connecting said shafts and said control lever for rotating said shafts in the swinging of said lever, a pair of sectors pivoted on axes at right angles intersecting at the point of intersection of said shafts and lever, said sectors passing through openings provided in said lever therefor, and means carried by said lever normally constrained to engage said sectors to lock said lever in any position of adjustment with relation thereto.

17. In a motor control system for aircraft and the like, the combination of a plurality of motors, a single main control, separate secondary controls for the separate motors, a link extending from said main control to a bank of said secondary controls, a throttle operating lever on each of said secondary controls, each having connection with a separate motor, arms on said secondary controls connected detachably with said throttle levers and linked together in tandem to be moved together, and a connection between the arm of the first secondary control of the bank with said link extending from said main control, said detachable connections between said throttle levers and said arms permitting disconnection of any secondary control of the bank from in tandem with the other controls to permit individual manipulation of the several controls.

18. In a motor control system for aircraft and the like, the combination of a plurality of motors, a single main control, separate secondary controls for the separate motors, a link extending from said main control to a bank of said secondary controls, a throttle operating lever on each of said secondary controls, each having connection with a separate motor, arms on said secondary controls connected detachably with said throttle levers and linked together in tandem to be moved together, a connection between the arm of the first secondary control of the bank with said link extending from said main control, and an auxiliary means on each of said secondary controls for operating said throttle levers when the same are disconnected from said arms.

19. In a motor control system for aircraft and the like, the combination of a plurality of motors, a single main control, separate secondary controls for the separate motors, a link extending from said lever on each of said secondary controls, each having connection with a separate motor, arms on said secondary controls connected detachably with said throttle levers and linked together in tandem to be moved together, a connection between the arm of the first secondary control of the bank with said link extending from said main control, and an auxiliary means on each of said secondary controls permitting the coarse or fine adjustment of the throttle levers as desired when said throttle levers are disconnected from said arms.

20. In a motor control system for aircraft and the like, the combination of a plurality of motors, a single main control, separate secondary controls for the separate motors, a link extending from said main control to a bank of said secondary controls, a throttle operating lever on each of said secondary controls, each having connection with a separate motor, arms on said secondary controls connected detachably with said throttle levers and linked together in tandem to be moved together, a connection between the arm of the first secondary control of the bank with said link extending from said main control, said detachable connections between said throttle levers and said arms permitting disconnection of any secondary control of the bank from in tandem with the other controls, and an auxiliary means on each of said secondary controls for operating said throttle levers independently of the movement of said arms, said auxiliary means comprising mechanism for adjusting said throttle lever to place the same in step with the arm which normally operates the same so that the same may be connected therewith again to operate therewith as before.

21. In a motor control system for aircraft and the like, the combination of a plurality of motors, a single main control, separate secondary controls for the separate motors, a link extending from said main control to a bank of said secondary controls, a throttle operating lever on each of said secondary controls, each having connection with a separate motor, arms on said secondary controls connected detachably with said throttle levers and linked together in tandem to be moved together, a connection between the arm of the first secondary control of the bank with said link extending from said main control, said detachable connections between said throttle levers and said arms permitting disconnection of any secondary control of the bank from in tandem with the other controls, and an auxiliary means on each of said secondary controls for operating said throttle levers independently of said arms when the same are disconnected therefrom, said secondary means enabling a fine adjustment of the position of said throttle lever for placing the same in step with the position of the arm normally operating the same so that the lever may be again connected therewith to operate together therewith as before.

22. In a motor control system for aircraft and the like, a throttle operating lever, a first lever for moving the same, a second lever for moving the same, and clutching means for selectively connecting either said first or said second levers with said throttle operating lever to move the same.

23. In a motor control system for aircraft and the like, a throttle operating lever, a first lever for moving the same, a second lever for moving the same, and clutching means for selectively connecting either said first or said second levers with said throttle operating lever to move the same, said first lever being connected through said second lever to said throttle lever.

24. In a motor control system for aircraft and the like, a throttle operating lever, a first lever for moving the same, a second lever for moving the same, clutching means for selectively connecting either said first or said second levers with said throttle operating lever to move the same, said first lever being connected through said second lever to said throttle lever, and means for adjusting the relation of said second lever to said first lever.

25. In a motor control system for aircraft and the like, a throttle operating lever, a first lever for moving the same, a second lever detachably connected with the first lever for moving said throttle lever whereby said first lever operates said throttle lever through said second lever, and clutching means for selectively connecting either said first lever with said throttle operating lever, or said second lever with said throttle operating lever when the same is disconnected from said first lever, said clutching means enabling the connection of said first and second levers in only one position.

26. In a motor control system for aircraft and the like, a throttle operating lever, a first lever for moving the same, a second lever detachably connected with the first lever for moving said throttle lever, whereby said first lever operates said throttle lever through said second lever, clutching means for selectively connecting either said first lever with said throttle operating lever, or said second lever with said throttle operating lever when the same is disconnected from said first lever, and means for coarsely or finely adjusting said second lever to communicate a coarse or fine movement to said throttle operating lever.

27. In a motor control system for aircraft and the like, a throttle operating lever, a first lever for moving the same, a second lever connected with the first lever for moving said throttle lever, whereby said first lever operates said throttle lever through said second lever, clutching means for selectively connecting either said first lever with said throttle operating lever, or said second lever with said throttle operating lever when the same is disconnected from said first lever, said clutching means enabling the connection of said first and second levers in only one position, and means for coarsely adjusting the position of said second lever to communicate a coarse movement to said throttle lever, and for finely adjusting the position of said second lever to communicate a fine movement to said throttle lever and to finely adjust the relation of said second lever to said first lever to enable the connection of said second lever with said lever through said clutching means.

28. In a motor control system for aircraft and the like, a throttle operating lever, a shaft, a first lever mounted on said shaft for operating said throttle lever, means forming a connection between said second lever and said first lever, and means for clutching said shaft to said first lever whereby said throttle lever is operated through said second lever from said first lever, said clutch when disengaged permitting movement of said throttle lever only by said second lever.

29. In a motor control system for aircraft and the like, a throttle operating lever, a shaft, a first lever on said shaft for operating said throttle lever, a second lever on said shaft for operating said lever, a first clutch for connecting said first lever with said shaft and thereby connecting said first lever to said second lever to operate said throttle lever through said second lever from said first lever, and a second clutch arranged to be engaged when said first clutch is disengaged whereby said second lever is disconnected from said first lever to permit movement of said throttle lever by said second lever independently of the movement of said first lever.

30. In a motor control system for aircraft and the like, a throttle operating lever, a shaft, a first lever mounted on said shaft for operating said throttle lever, a gear sector fixed to rotate with said shaft, a gear adjustably mounted on said second lever engaging said gear sector to adjust the relation of said second lever thereto, a first clutch for connecting said first lever to said shaft to rotate the latter and thereby move said throttle lever through the movement of said second lever with said sector, and a second clutch engaged when said first clutch is disengaged for holding said shaft against rotation whereby said throttle lever may be moved only by said second lever independently of said first lever.

31. In a motor control system for aircraft and the like, a throttle operating lever, a shaft, a first lever mounted on said shaft for operating said throttle lever, a second lever mounted on said shaft for operating said throttle lever, a gear sector fixed to rotate with said shaft, a worm adjustably mounted on said second lever engaging said gear sector to adjust the relation of said second lever thereto, a first clutch for connecting said first lever to said shaft to rotate the latter and thereby move said throttle lever through the movement of said second lever with said sector, and a second clutch engaged when said first clutch is disengaged for holding said shaft against rotation whereby said throttle lever may be moved only by said second lever independently of said first lever, said worm being disengageable from said sector to permit the free movement of said second lever with respect thereto.

32. In a motor control system for aircraft and the like, a throttle operating lever, a shaft, a first lever mounted on said shaft for operating said throttle lever, a second lever mounted on said shaft for operating said throttle lever, a gear sector fixed to rotate with said shaft, a gear adjustably mounted on said second lever engaging said gear sector to finely adjust the relation of said second lever thereto, a first clutch for connecting said first lever to said shaft to rotate the latter and thereby move said throttle lever through the movement of said second lever with said sector, and a second clutch engaged when said first clutch is disengaged for holding said shaft against rotation whereby said throttle lever may be moved only by said second lever independently of said first lever, said gear being disengageable from said sector to permit the free or coarse movement of said second lever with respect thereto.

33. In a motor control system for aircraft and the like, a throttle operating lever, a bevel gear for moving the same, a shaft, a bevel gear thereon meshing with said first bevel gear, a first lever mounted on said shaft to operate said throttle lever, a gear sector fixed against rotation relative to said shaft alongside said second lever, a gear on said second lever meshing with said sector for adjusting the relation of said second lever to said sector, a first clutch for connecting said first lever to said shaft to rotate said throttle lever through said second lever from said first lever and a second clutch arranged to be engaged when said first clutch is disengaged for securing said shaft against rotation to hold said sector rigid and permit movement of said throttle lever from said second lever in the adjustment of said second lever in relation to said sector.

34. In a motor control system for aircraft and the like, a throttle operating lever, a bevel gear for moving the same, a shaft, a bevel gear thereon meshing with said first bevel gear, a first lever mounted on said shaft to operate said throttle lever, a second lever fixed to said second gear to operate said throttle lever, a gear sector fixed against rotation relative to said shaft alongside said second lever, a gear on said second lever meshing with said sector for adjusting the relation of said second lever to said sector, a first clutch for connecting said first lever to said shaft to rotate said throttle lever through said second lever from said first lever, a second clutch engaged when said first clutch is disengaged for securing said shaft against rotation to hold said sector rigid and permit movement of said throttle lever from said second lever in the adjustment of said second lever in relation to said sector, said gear on said second lever being disengageable from said sector to permit a coarse adjustment of said second lever in relation to said sector, said gear when in mesh with said sector providing a fine adjustment of said second lever in relation thereto.

35. In a motor control system for aircraft and the like, a throttle operating lever, a bevel gear for moving the same, a shaft, a bevel gear thereon meshing with said first bevel gear, a first lever mounted on said shaft to operate said throttle lever, a second lever fixed to said second gear to operate said throttle lever, a gear sector fixed against rotation relative to said shaft alongside said second lever, a gear on said second lever meshing with said sector for adjusting the relation of said second lever to said sector, a first clutch for connecting said first lever to said shaft to rotate said throttle lever through said second lever from said first lever, a second clutch for securing said shaft against rotation to hold said sector rigid and permit movement of said throttle lever from said second lever in the adjustment of said second lever in relation to said sector, and means for preventing the engagement of one of said clutches when the other is engaged and for holding both of said clutches disengaged as desired.

36. In a motor control system for aircraft and the like, a throttle operating lever, a bevel gear for moving the same, a shaft, a bevel gear thereon meshing with said first bevel gear, a first lever mounted on said shaft to operate said throttle lever, a second lever fixed to said second gear to operate said throttle lever, a gear sector fixed against rotation relative to said shaft alongside said second lever, a worm pivotally and rotatably mounted on said second lever meshing with said sector for finely adjusting the relation of said second lever to said sector, a first clutch for connecting said first lever to said shaft to rotate said throttle lever through said second lever from said first lever, and a second clutch for securing said shaft against rotation to hold said sector rigid and permit movement of said throttle lever from said second lever in the adjustment of said second lever in relation to said sector, said worm gear being arranged to be swung clear of said sector and permit free or coarse adjustment of said second lever relative to said sector, and means for locking said worm gear in meshing engagement with said sector.

In testimony whereof I affix my signature.

WALTER H. BARLING.